United States Patent Office 2,846,878
Patented Aug. 12, 1958

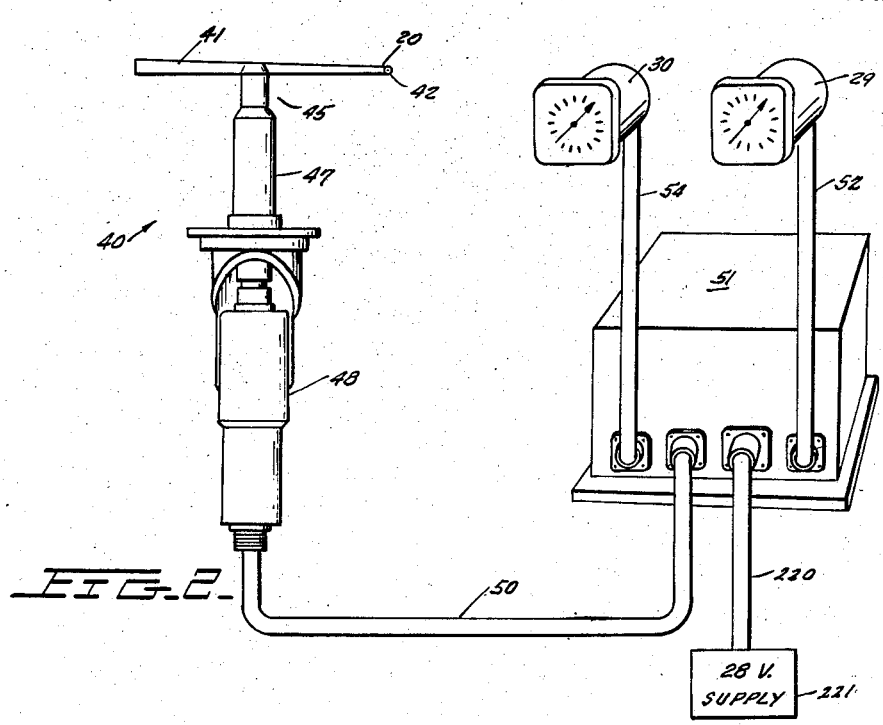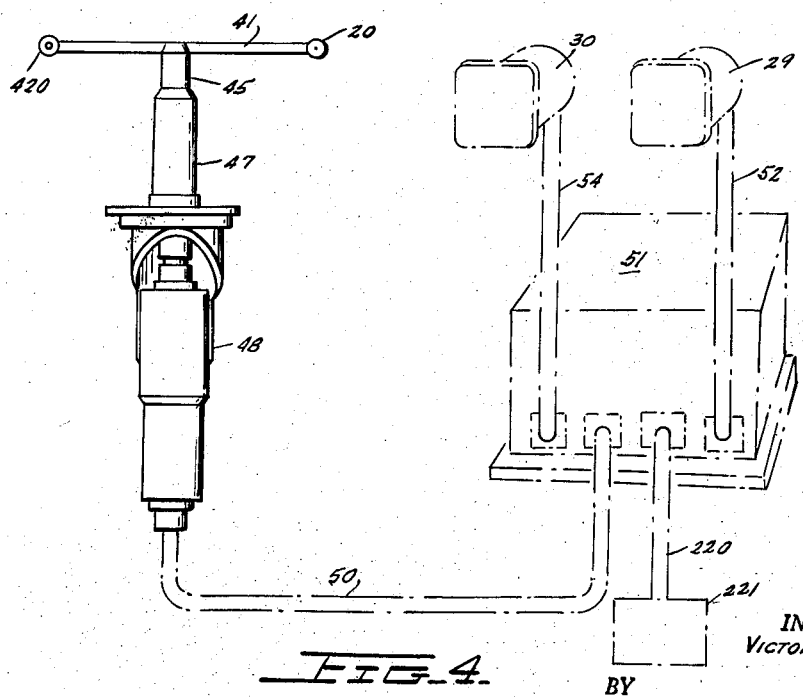

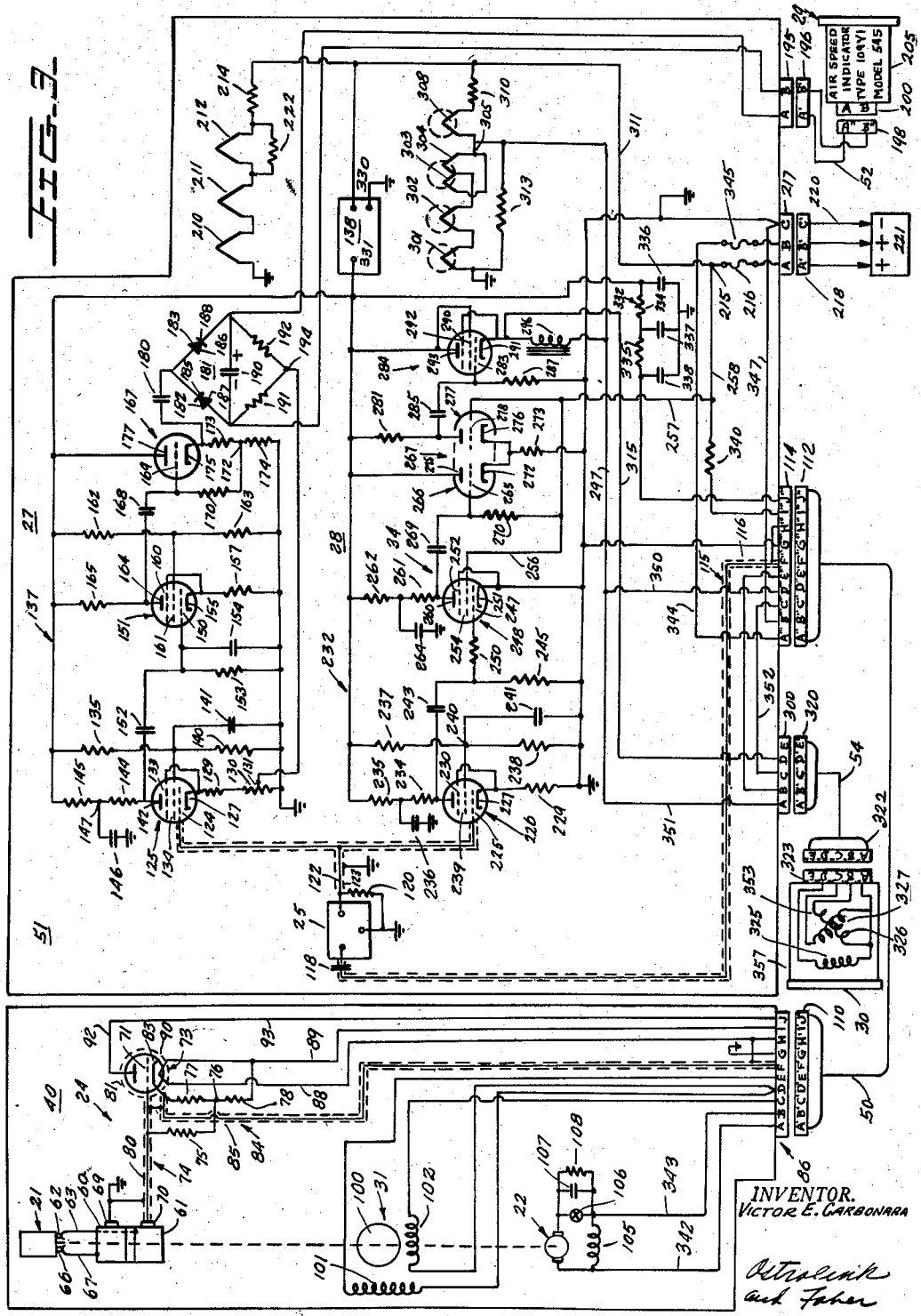

2,846,878

AIR VELOCITY INDICATOR

Victor E. Carbonara, Manhasset, N. Y., assignor to Kollsman Instrument Corporation, Elmhurst, N. Y., a corporation of New York Application April 6, 1954, Serial No. 421,290

3 Claims. (Cl. 73—182)

The present invention relates to air speed indicators and more particularly to air speed indicators for helicopters.

It is well-known that, in contrast with conventional aircraft which require a minimum sustaining air speed, helicopters can remain airborne when their air speed is zero. Therefore, air speed indicators, such as those used in conventional aircraft, are of little use in helicopters since they will not function at the low air speeds at which the latter are sometimes operated. When air speed of a helicopter is not zero in all lateral directions, the air speed of its rotating wing varies during one revolution. During one half of a revolution the air speed of the helicopter will be added to that of the wing, while during the other half it will be subtracted therefrom.

If then a pitot or impact tube is mounted at the tip of a rotating wing, it will experience pressure variations in the approximate form of a sine wave during each rotation of the wing when the air speed is not zero.

However, if the angular velocity of the wing or, better, the translational rotary speed of the pitot tube is low, the pressure variations will often be too low to provide accurate indications of air speed. Moreover, aircraft of the rotating wing type may have air speed directions that are far from coincident with their heading. To be more precise, the yaw angle of a helicopter, that is the angle between the fore and aft axis of the craft and the direction of its motion with respect to the air mass in which it is flying, is sometimes much greater than in conventional aircraft and can vary as much as 180°+ or —. Thus, if the direction of flight is to be determined, an air speed indicator suitable for use in helicopters must also be capable of measuring yaw angles varying all the way from zero to 360°.

When the maximum peripheral velocity of a wing-tip-mounted pitot tube is small; say that resulting from the wing's rotation and the normal air speed of a helicopter; the pressure generated is inadequate to provide accurate indication of air speed. When, however, the peripheral velocity of the pitot tube is high compared to the aircraft's air speed, and the angle of its plane of rotation with respect to the resultant wind is not in excess of 40°, the pressure variations in the tube are closely proportional to the square of the air speed of the craft, regardless of its direction.

In addition to the above considerations, it is important to position the pitot tube where air turbulence is at a minimum so that the tube will not give erroneous indications of pressure variations due only to air speed. To accomplish this it is often necessary to position the pitot tube at a considerable distance from its associated amplifiers and indicating instruments, thus necessitating a long transmission line and consequent capacitive loading of the output of the transducer element which may, for example, be a piezoelectric crystal.

The present invention satisfies these considerations by providing a separate driving means for and suitably locating the pitot tube so that it will be relatively free of turbulence and its peripheral speed will be constant and high with respect to the air speed to be measured, regardless of the angular speed of the sustaining wing. This serves to raise the pitot pressure which, as previously described, becomes especially necessary, at low air speed.

Accordingly, one object of the present invention is an air speed indicator suitable for operation at low air speeds.

Another and more specific object of the present invention is the provision of means for increasing the accuracy of a low-air speed indicator by increasing the air pressure whereby it functions.

Another object of the present invention is the provision of means for making the peripheral speed of the pitot tube independent of variations in speed of the rotary wings.

Moreover, the present invention provides means for easily and accurately transforming pressure variations into electrical signals in air velocity indicators.

It was mentioned above that air speed indicators suitable for helicopters must also provide measurements of yaw. This is accomplished in this novel air speed or velocity indicator by the provision of means for comparing the phase angle of the sinusoidal output of the transducer with that of a reference sinusoidal current of the same frequency; the phase difference between which is a measure of the angle of yaw.

Another object of the present invention is, therefore, the provision of means for obtaining a measurement of the yaw angle of an aircraft simultaneously with a measurement of air speed.

The maximum pressure developed in a rotating pitot tube is that due to its peripheral velocity ($p$) and to the pressure ($a$) caused by the air speed of the craft. The pressure caused in a normally mounted pitot tube by the air ramming into it is approximately proportional to the square of the air speed. Thus the pressure in the rotating tube on its circular path about its axis when it is advancing in the same direction as the apparent motion of the craft is greatest and is proportional to $(p+a)^2$. When going in the opposite direction (downwind) its pressure is least and is proportional to $(p-a)^2$. Hence the greatest cyclic variation in pressure as the pitot tube rotates is proportional to $(p+a)^2-(p-a)^2$ or $$p^2+2ap+a^2-(p^2-2ap+a^2)$$

or $4ap$. This means that although the instantaneous pressures vary as the square of the resultant air speed of the pitot tube, the amplitude of the cyclic variations in pressure is directly proportional to both the peripheral speed and, what is most important, the air speed of the craft.

Finally to overcome the loading caused by long transmission lines between the piezo electric crystal or other transducer and the electric amplifiers, this novel air speed indicator is provided with a cathode follower whose output is so low in comparison with its input impedance that no such loading occurs. The cathode follower is connected very close to the piezo electric crystal so that the capacitance of the connecting leads is small and the output signal voltage correspondingly large.

Another object of the present invention is, therefore, the provision of means for lowering the output impedance of a transducer and for decreasing the capacitance of its output.

More specifically, in one embodiment of the present invention a pitot tube or probe is mounted at the end of a six-inch arm and translationally rotated at a constant speed about a normally vertical axis.

The transducer is a precision acoustic instrument of considerable sensitivity, which transforms pressure variations into electrical signals. Its output signals are applied to a cathode follower of inherently low output impedance. Thus, when a transmission line is connected at the output of the cathode follower, no loading occurs. The cathode follower is in the same assembly as the probe and the driving motor as indicated in Figures 2 and 4.

At the other end of the transmission line are two amplifiers in parallel; the velocity amplifier and the direction amplifier. The output of the velocity amplifier is fed into an air speed indicator, which, when properly calibrated, gives readings of the air speed of the helicopter. The direction amplifier operates the air direction indicator which gives a continuous indication of the yaw angle of the helicopter with respect to the resultant wind.

In another embodiment of the present invention, two pitot tubes are positioned at opposite ends of an arm and translationally rotated about a normally vertical axis at 3600 R. P. M., and each activates a transducer. The outputs of the transducers are combined and fed into a cathode follower whose amplified output operates indicators as previously described.

The foregoing and many other objects of the invention will become apparent in the following description and drawings in which:

Figure 2 is a schematic view of the air velocity indicator of the present invention.

Figure 3 is the electrical circuit diagram of one embodiment of the present invention.

Figure 4 is a schematic view of another embodiment of the present invention.

Figure 1:
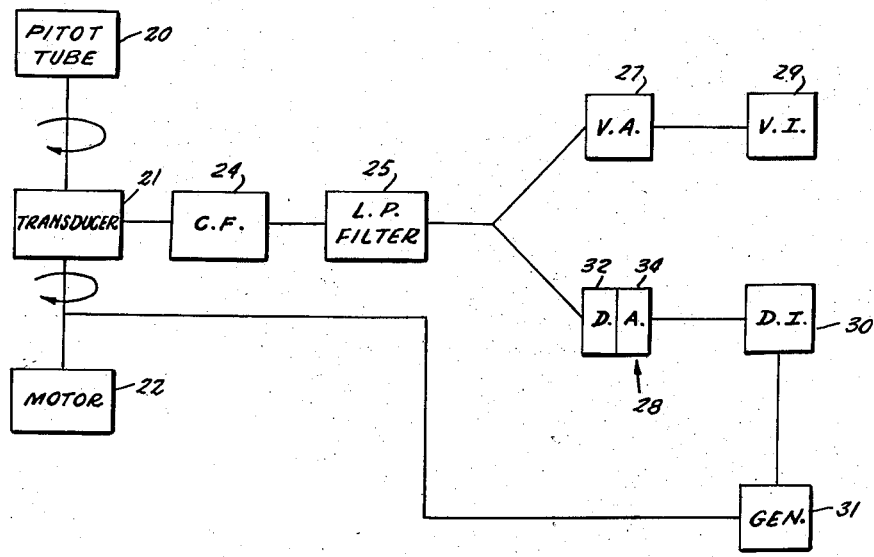
Figure 1 is a block diagram of one embodiment of the present invention.

Referring first to Figure 1 showing a block diagram of one embodiment of the present invention, pitot tube 20 and transducer 21 are rotated at a constant speed by a motor 22. Pitot tube 20, as hereinafter described, is actually mounted on an arm centrally driven for rotation by motor 22.

Generator 31 is a permanent magnet generator driven at a constant speed to supply a sinusoidal signal of a given frequency. The current from amplifier 28 is derived from pitot tube 20, and has the same frequency, for example 60 cycles per second, but its phase varies in accordance with the yaw angle of the aircraft; that is on the angular positions at which pitot tube or tubes 20 experience maximum and minimum pressure.

Since generator 31 and motor 22 rotate at the same speed, the signals generated by generator 31 and transducer 21 and applied to amplifier 28 have the same frequency. Thus the phase angle difference between the two signals is made to indicate the yaw angle of the aircraft as will become apparent in the following discussion.

It can be shown, in fact, that the phase of the sinusoidal variations in impact pressure on the pitot tube 20 and hence the output from amplifier 28 is a function angle between the relative wind and the fore and aft axis of the helicopter; so that if the permanent magnet generator produces a sinusoidal voltage which bears a proper fixed relation to the longitudinal axis of the helicopter, the phase difference between the two signals will be equal to the angle between the direction of the resultant wind and the helicopter's longitudinal axis; which is the required yaw angle.

In actual practice amplifier 28 is formed by two sections, the amplifying device 32 and a limiting device 34. The function of the limiting device 34 is to limit the amplitude of a signal to a certain preselected value so that only its phase and not its amplitude will effect the reading on phase meter 30.

Referring now to Figure 2 which schematically illustrates the configuration of one embodiment of the present invention, probe 40 consists of the pitot tube 20 mounted on a rotating arm 41 and having its orifice 42 at one end of arm 41, assembly 45 comprising essentially transducer 21 which also rotates with arm 41; assembly 47 containing both the permanent magnet generator 31, rotating with arm 41; and finally assembly 48 consisting of driving motor 22. Driving motor 22 in the present embodiment has a constant speed of 3600 R. P. M. so that the peripheral velocity of the orifice 42 of pitot tube 20 is high with respect to the air speed of the helicopter. Cathode follower 24 is stationary.

Making the peripheral velocity of the orifice 42 of pitot tube 20 relatively high increases the pressure available for speed measurements, so that even very low speeds of the order of 2 miles per hour will be determined with fairly good accuracy.

In one embodiment of the present invention, a pitot tube is mounted at the end of a six-inch arm which rotates at 3600 R. P. M. about a normally vertical axis. This produces sinusoidal pressure variations of the convenient frequency of 60 C. P. S.

The output from pitot assembly 40 is applied through an appropriate transmission line 50 to the amplifier and power supply assembly 51. The amplified signals from assembly 51 deflect a voltmeter 29 calibrated in miles/hour, and to operate a phasemeter 30, calibrated in degrees as a yaw angle meter. The connection between assembly 51 and meters 29 and 30 located on the control panel of the aircraft is obtained through appropriate lines 52 and 54, respectively.

Referring now to Figure 3 showing the electrical diagram of one embodiment of the present invention, transducer 21 which is mounted in probe assembly 40 (see also Figure 2) and is mechanically stressed by pitot tube 20 consists in this case of a precision crystal capable of reacting to pressure pulses throughout the audio frequency range and having a high resonant frequency, for example, above 40 kilocycles.

Pressure pulses applied through pitot tube 20 to crystal 21 cause it to generate, in a manner well-known in the art, a difference of potential between two of its surfaces, which is a function of the mechanical pressure applied to the crystal's other surfaces. This potential difference is applied to conductive rings 60 and 61 mounted in assembly 47 for rotation with crystal 21 and pitot tube 20. More precisely, one surface of crystal 21 is connected to ring 61 by means of contact 62 and lead 63, while the other surface of crystal 21 is connected to ring 60 by means of contact 66 and lead 67. A pair of carbon brushes 69 and 70 in electrical contact with rings 60 and 61, respectively, mounted stationarily on probe assembly 40 serves to pick up the electrical signal or potential difference developed by transducer 21.

Brush 70 is connected to the grid 71 of electron tube 73 of cathode follower stage 24 through a shielded lead 74. A grid leak resistor 75 is connected between the grid 71 of tube 73 and the connecting point 76 between cathode resistors 77 and 78.

The other brush 69 is connected to ground and to the shield 80 of lead 74, in turn electrically engaging shield 81 of tube 73. By this means the information carrying circuit is protected against pick ups of hum noise or other interference.

The cathode 83 of tube 73 connected to cathode resistors in series 76 and 78 is the output element in this amplifier stage and is connected to a shielded lead 84 having its shield 85 at ground potential through connection with the shield 80 of lead 74. Output lead 84 terminates at contact F of terminal strip or socket 86 of probe 40.

Also terminating at socket 86 but at contacts H and I are lead 88 and 89 from filament 90 of tube 73. Previously mentioned cathode resistor 78 has one side connected to point 76, the other to filament lead 89.

Both shield 85 and filament supply lead 88 are connected to grounded contact G of terminal socket 86 to assure that minimum hum noise is present in cathode follower stage 24.

Plate 92 of tube 73 is connected through lead 93 to contact J of terminal socket 86.

Rotating with crystal 21 as shown by the dotted line is permanent magnet generator 31 consisting of the rotating element 100 and the stationary coils 101 and 102. Coils 101 and 102 are connected to each other on one side through contact D of the terminal socket 86. The other ends of coils 101 and 102 are connected to contacts E and C of terminal socket 86.

Pitot tube 20 (see Figures 1 and 2), crystal 21 and generator 31 are rotated by motor 22 having field coil 105 connected between terminals A. B of socket 86. The motor is provided with a centrifugal governor switch 106 connected in parallel with capacitance 107 and a small resistance 108. Whenever the speed of motor 22 exceeds the desired value, centrifugal switch 106 opens and places resistance 108 in the motor circuit to decrease the speed of the motor to the desired value.

When mounted, probe assembly 40 is engaged at its socket 86 by complementary contact assembly 110 consisting of contacts A' to J' removably engaging terminal socket 114 of assembly 51, having contacts A''' to J'''.

It will be noted that the transmission line 50 would have been a considerable load to crystal 21 due to the high output impedance of crystal 21 if connected directly to stage 24, lead 84 and transmission line 50 connected to the cathode 83 of cathode follower 73 see a low output impedance corresponding to the impedance of cathode follower stage 24 looking into the cathode 83 of tube 74. The loading effect of lead 84 and line 50 is now considerably reduced since the cathode follower output impedance can be made lower than the input impedance of lead 84 in series with line 50.

The signals from the cathode 83 of cathode follower tube 73 are transmitted through contacts F, F', line 50, contacts F'', F''' to a shielded lead 115 having its shield 116 connected to contact H''' and through contact H''', line 50, contact H' to contact H and thence to ground of probe 40. In other words, the signal from cathode follower 24 now appears between lead 115 and ground.

Lead 115 is connected through a coupling capacitor 118 to a low pass filter 25 which being a conventional circuit is shown in Figure 4 simply as a box.

The function of low pass filter 25 is to eliminate interfering or noise signals of frequency higher than the frequency of the desired signals, in this case 60 C. P. S.

The output from low pass filter 25 which appears across resistance 120, is, therefore, substantially free of unwanted signals and consists mainly of the desired 60 C. P. S. signal originating at the transducer 21. The signal from low pass filter 120 is applied through shielded lead 122, having its shield 123 grounded, to both the velocity amplifier 27 and the direction amplifier 28.

To be more specific, lead 122 is connected on the one hand to the control grid 124 of tube 125, in this example a pentode, used here because of its high gain. To cathode 127 of tube 125 are connected cathode resistors 129 and 130 in series between cathode 127 and ground. Actually resistor 130 is shown in Figure 4 as a potentiometer so that as hereinafter described the tap 131 may be set at the desired value of gain.

Suppressor grid 133 of tube 125 is connected conventionally to the cathode 127 and the screen grid 134 is connected through resistor 135 to supply lead 137 terminating at the D. C. supply, in this case the output of a dynamometer 138.

Screen grid 137 is also connected to ground through resistor 140 by-passed by capacitor 141. Essentially series resistors 135 and 140 constitute a voltage dividing network to provide the correct potential for screen grid 134.

Plate 142 of tube 125 is also connected to supply lead 137 and thence to the output of dynamometer 138 through plate load resistors 144 and 145 in series. A by-pass capacitor 146 is connected between ground and the common connecting point 147 of the two resistors 144 and 145.

The amplified output signal from tube 125 is applied to the grid 150 of the next amplifier tube 151 through coupling capacitor 152 and grid lead resistor 153, where coupling capacitor 152 is connected between the plate 142 of tube 125 and the grid 150 of tube 151 and resistor 153 is connected between grid 150 and ground. In parallel with resistor 153 is capacitor 154 of small value in this case for providing a high frequency filtering action at the input of the amplifier tube 151.

Cathode 155 of tube 151 is self-biased through cathode resistor 157 connected between cathode 155 and ground. Suppressor grid 160 of tube 151 is connected to the cathode and screen grid 161 is connected to the divider consisting of resistors 162 and 163 connected in series between supply lead 137 and ground so that screen grid 161 may operate at the desired screen grid voltage.

Plate 164 is connected to supply lead 137 through plate load resistor 165 and A. C. wise to the next stage tube 167 through coupling capacitor 168 connected between plate 164 of tube 151 and grid 169 of tube 167 and grid leak resistor 170 connected between grid 169 of tube 167 and connecting point 172 of series connected cathode resistors 173 and 174.

Cathode resistors 173 and 174 are connected between cathode 175 of tube 167 and ground. Plate 177 of tube 167 is connected directly to supply lead 137 and thence to the output of dynamometer 138.

This last stage of amplification consisting of tube 167 is operated as a cathode follower to provide as is well-known in the art a low output impedance through negative feedback.

The output from tube 167 is taken at its cathode 175 and applied through a coupling capacitor 180 to a rectifying device 181. The rectifying device 181 whose function is to provide a D. C. signal proportional to the amplitude of the sinusoidal signal generated at crystal 21 consists of rectifying elements 182 and 183 connected so that current can flow from capacitor 180 through element 183 in the direction indicated by the symbol used for the rectifying elements. Conversely then, current will flow through element 182 only when it is in the direction toward capacitor 180 or element 183.

More specifically, the cathode 185 of element 182 and the plate 186 of element 183 are connected to each other and to capacitor 180. The other electrodes 187 and 188 of elements 182 and 183, respectively, are connected to each other through a filtering capacitor 190 and resistors 191 and 192. Resistors 191 and 192 are connected to each other at 194 and to rectifying elements 182 and 183, respectively, where the function of resistors 191 and 192 is essentially that of smoothing the output from rectifying elements 182 and 183. To point 194 is connected the variable tap 131 of gain control potentiometer 130 to thus control the gain of the amplifier 27 in accordance with the calibration requirements of the velocity indicator.

The D. C. output from across resistors 191 and 192 appears at two terminal contacts A, B of terminal socket 195 which, after installation, are engaged by contacts A', B' of complementary contact assembly 196. Assembly 196 is at one end of line 52 having similar contacts A'', B'' at its other terminal assembly 198. Terminal assembly 198 engages terminal assembly 200 through its contacts A''' and B'''. Assembly 200 is mounted on a D. C. voltmeter 25 having its face appropriately calibrated in miles per hour, for example, so that it operates as the air speed indicator 29 of Figure 1 or 2.

The filament for tubes 125, 151 and 167 are, respectively, filaments 210, 211 and 212 connected in series so that one end of filament 210 is grounded and one end of filament 212 is connected through resistor 214 to connecting point 215 and thence through a fuse 216 to contact A of terminal socket 217. Terminal socket 217 is also provided with contacts B and C, the function of which will be described hereinafter.

When the present air velocity indicator is mounted, then the complementary contact assembly 218 having the complementary contacts A', B' and C' engages terminal socket 217 so that electrical connection is obtained between contacts A, B, C and A', B' and C', respectively.

Contact assembly 218 is connected to one end of a power cord 220. Cord 220 during operation of the air velocity indicator is connected to an appropriate D. C. supply, for example, a 28 volt D. C. supply 221 with polarities as shown in the drawing of Figure 3. Across filament 212 is connected a resistor 222.

It was previously mentioned that the output from filter 25 is also applied through the same shielded lead 122 to direction amplifier 28. More specifically, the signals from shielded lead 122 are applied to grid 225 of first amplifier tube 226. Tube 226 has its cathode 227 connected to ground through an unby-passed cathode resistor 229 so that the desired grid to cathode bias is obtained in addition to stabilizing feedback.

Connected to cathode 227 is suppressor grid 230. Plate 231 of tube 226 is connected to supply lead 232 through the combination of series resistors 234, 235. A by-passing capacitor 236 is connected between ground and the connecting point between resistors 234 and 235.

As in the case of supply lead 137 for the velocity amplifier, supply lead 232 of the direction amplifier is connected to the output of dynamometer 138 supplying the correct D. C. supply voltage.

Connected between supply lead 232 and ground is a series combination of resistors 237 and 238. The magnitudes of resistors 237 and 238 are so selected that their common point 240 is at the correct D. C. voltage for screen grid 239 of tube 226. Therefore, screen grid 239 is connected to this common point 240 and is by-passed to ground by capacitor 241 connected between point 240 and ground.

The output from this first amplifier tube is derived by an R. C. coupling network consisting of capacitance 243 connected on one side to plate 231 of tube 226 and on the other to grid leak resistor 245 which is connected on its other side to ground. The ungrounded side of grid leak resistor 245 is connected to the grid 247 of the next tube 248 through a series resistance 250.

Tube 248 in the present embodiment is also a pentode. The function of tube 248 is one of limiting, that is, one of changing the output from amplifier tube 226 into a constant amplitude signal so that the amplitude of this signal will not in any way produce unwanted readings in the direction indicator 30. Therefore, cathode tube 251 of pentode 248 is grounded and suppressor grid 252 as is conventional is connected to the cathode 251. Screen grid 254 is connected to point 215 and thence to the 28 volt D. C. supply 221 through leads 256, 257, 258 in series.

Plate 260 of tube 248 is connected to supply lead 232 through the combination of series resistors 261 and 262. The junction point between resistors 261 and 262 is by-passed to ground by means of by-passing capacitor 264. Operation of the tube 248 as a limiting device, that is, a device which serves to maintain the amplitude of a signal applied to its grid constant when it appears at its plate, becomes obvious when it is pointed out that the resistor 250 in series with grid 247 of tube 248 and grid resistor 245 functions as a self-biasing device for tube 248 in what is generally known as grid leak bias.

The function of grid leak bias resistor 250 is to develop an additional bias, an addition that is to the one existing when signals of the desired amplitude are applied to grid 247 of tube 248. When, then, signal voltages having amplitudes greater than the desired ones are applied to grid 247 and cathode 251 of tube 248 through grid leak bias resistor 250 in proportion to the excess signal amplitude to drive the grid 247 to cut off for that portion of the signal that is in excess to the desired amplitude.

The output signal appearing between plate 260 and cathode 251 of tube 248 is, therefore, of constant amplitude and can now be applied to grid 256 of triode section 266 of tube 267 through a capacitor 269 connected between the plate tube 267 through a capacitor 269 connected between the plate 260 of tube 248 and the grid 265 of triode section 266 and grid leak resistor 270 connected between grid 265 of triode section 266 and lead 256 which, as previously mentioned, terminates at the contact A of terminal socket 217.

Cathode 272 of triode section 266 is biased above ground by bias resistor 273 connected between cathode 272 and ground.

Plate 275 of triode section 266 is connected directly to supply lead 252 and thence to the output of dynamometer 138. Cathode resistor 273 also connects cathode 276 of triode section 277 of tube 267 to ground so that across it will also appear the output signal from limiter tube 248.

Tube 267 operates as a limiter. Effectively it clips the sinusoidal input signal at a predetermined positive or negative value of potential. Thus there results a truncated sinusoidal wave form which becomes a square wave when it is driven by a sinusoidal potential much greater than the clipping levels of the tube.

Grid 278 of triode section 277 is connected to lead 256 and thence to contact A of thermal socket 217 so that it is properly based with respect to ground or cathode 276.

Plate 280 of triode section 277 is connected to supply lead 232 through plate load resistor 281. The output signal from triode 277 is applied to grid 282 of the following tube 284 through an R–C coupling network consisting of capacitor 285 connected plate 280 of triode section 277 and grid 283 of tube 284 and grid leak resistor 287 connected between grid 283 of tube 284 and ground.

Tube 284, in this case a pentode, has its suppressor grid 290 connected to its cathode 291 and its screen grid 292 connected to its plate 293. Plate 293 is also connected to triode connected supply lead 232. The operation of tube 284 is, therefore, such that the voltage applied to screen grid 292 is equal to the voltage applied to plate 293.

Connected to cathode 291 of tube 284 is a choke or high inductance coil 96 having its other end connected to lead 297 terminating at contact A of terminal socket or strip 300.

Filament 301 for tube 226 is grounded on one side and connected on the other side of filament 302 of tube 248. Filament 302 in its turn has its other side connected to the center point 303 of filament 304 shown here as a double filament since it is the filament of tube 267, in this case a double triode requiring a 12 volts filament supply.

Actually, the two extremities of filament 304 are connected to each other and while, as previously mentioned, the center point 303 is connected to filament 302 of preceding tube 248, their second common point 305 is connected to one side of filament 308 of tube 284. The other side of filament 308 is connected through a resistor 310 to lead 311 and thence to contact A of terminal socket 217. In addition, a resistance 313 connects the low side of filament 308 to ground and, therefore, is in parallel with respect to the series connected filaments 301, 302 and 304. Common point 305 is also connected to lead 297 and thence to contact A of terminal socket 300.

The output from tube 284 appears across inductance 296 and is applied through leads 297 and 315 to contacts A and D, respectively, of terminal socket 300. When appropriately mounted, contacts A and D and the remaining contacts B, C and E of terminal socket 300 are engaged by contacts A', B', C', D', E' of the complementary contact assembly 320 at one end of transmission line 54. At the other end of transmission line 54 there is a similar complementary contact assembly 322 consisting of complementary contacts A″ to E″ which engage contacts A‴ to E‴ of contact assembly 323 mounted, for example, in the back of direction indicator or phase meter 30. By means of contact assemblies 300, 320, 322 and 323 and transmission line 54, it is then possible to apply the signal from direction amplifier 28 across contacts A⁗ and D⁗ of assembly 323 of yaw indicator 30.

Connected across contacts A‴ and D‴ is one coil 325 of phase meter 30. Also connected to contact A‴ are the terminals of two coils 326 and 327 which have their other ends connected, respectively, to contacts B‴ and C‴ of contact assembly 323.

As was previously mentioned, the plate voltage necessary for the operation of the tubes of amplifiers 27 and 28 and cathode follower 24 is obtained by means of a dynamometer 138. Dynamometer 138 is operated by a low voltage, for example 24 volts, obtained from the supply 221 and applied to the input side 330 of dynamometer 138 by means of lead 311, fuse 216 and contacts A and A′ of contact assemblies 217 and 218, respectively.

The output side 331 of dynamometer 138 as described above is applied through, or in some case without appropriate plate load resistors, to the plates of tubes 125, 151, 167, 226, 248, 267 and 284 of amplifiers 27 and 28.

The same output is applied to the plate 92 of cathode follower tube 73 only after smoothing out the output from dynamometer 138 by means of filter 332.

The need for filter 332 becomes evident if one notes that cathode follower tube 73 is the first amplifier for the signal generated at crystal 21.

In other words, amplifier tube 73 must have the least amount of noise hum and stray signals so that at its output the desired amplified signal from crystal 21 will appear clearly without any stray signals or, in other words, so that the signal to noise ratio is high in cathode follower 24.

Filter 332 consists of smoothing resistances 334 and 335 connected in series so that one end of resistor 334 is connected to output terminal 331 of dynamometer 138 and one terminal of resistor 335 is connected to contact J‴ of terminal socket 114. In addition, three capacitors 336, 337 and 338 connect, respectively, the previously mentioned end of resistor 332, the end of resistor 335 and the junction point between the resistor 332 and 335 to ground to thus complete filter 332.

The D. C. voltage appearing between contact J‴ and ground is now quite free of ripples and is applied through contact J‴, contact J″, transmission line 50, contact J′ and contact J of contact assemblies 110 and 86, respectively, through lead 93 to plate 92 of cathode follower tube 73.

Filament voltage is applied to filament 90 of tube 73 through leads 88 and 89, of which lead 88 is grounded, terminating at contacts H and I of terminal socket 86. Contacts H and I are engaged by contacts H′ and I′ of contact assembly 110 and through line 50 and contacts H″ and I″, they are electrically connected to contacts H‴ and I‴ of contact assembly 114. Contacts H‴ is connected to contact F‴ and to the shield 116 of lead 115 as previously mentioned so as to ground shield 116.

Contact I‴ is connected to junction 215 through series dropping resistance 340 and lead 258. As previously mentioned, a D. C. voltage, in this example of 24 volts, appears between junction point 215 and ground so that a desired fraction of it determined by the magnitude of resistor 340 is applied through the above described circuit to filament 90 of cathode follower tube 73.

The power necessary to drive motor 22 is also obtained from power supply 221. More specifically, the terminal leads 342 and 343 of motor 22 are connected to contacts A and B of terminal socket of probe 40. Contacts A and B are engaged by their complementary contacts A′ and B′ of assembly 110 at one end of transmission line 50 which terminates at the other end of the contacts A″ and B″ of complementary assembly 112 which in their turn engage, respectively, contacts A‴ and B‴ of terminal socket 114.

Contact A‴ is connected through lead 344 to a fuse 345 and thence to terminal B of terminal socket 217. Contact B is engaged by contact B′ of assembly 218 which is connected to power supply 221 or more specifically in this case is connected to a +24 volts terminal of supply 221 through line 220. Contact B‴ of terminal socket 114 is connected through lead 347 to contact C of terminal socket 217 so that when contact C is engaged by contact C′, contact B‴ of assembly 114 is connected to the negative terminal of supply 221.

To summarize the above, motor 22 is energized, in this particular example, by the 24 volt supply 221 through the above-mentioned circuit.

Output coils 101 and 102 of permanent magnet generator 31, which as previously mentioned is driven by motor 22, are connected to each other on one side and to contact D′ of terminal socket 86 and have the other terminal of coil 101 connected to contact E and the other terminal of coil 102 connected to contact C of terminal socket 86. Contacts C and E are engaged by contacts C′ and E′ of complementary assembly 110 and through line 50 are in electrical contact with their corresponding contacts C‴ and E‴ of terminal socket 114. A similar path can be easily traced for contact D which as can be seen in Figure 3 is in electrical contact with contacts D‴ of terminal socket 114.

Contact D‴ is connected through leads 350 and 351 to contact A of terminal socket 300 and thence through contact A′ of complementary assembly 320, transmission line 54, contacts A″ and A‴ of assemblies 322 and 323, respectively, to the common terminal of coils 325, 326 and 327. Contact C‴ of socket 114 is connected through line 352 to contact C of socket 300 and thence through contact C′ of assembly 320, line 54, contact C″ and contact C‴ to the other end 353 of coil 327. Contact E‴ of socket 114 is connected to contact B of socket 300 and thence through contact B′, line 54, contacts B″ and B‴ to the other end 355 of coil 326. It should be noted that socket 300 has an additional contact E which through contact E′, line 54, contacts E″ and E‴ engages the metallic casing 357 of phase meter 30 so that when contact E of socket 300 is grounded, also the metallic casing 357 of phase meter 30 is grounded.

Finally, it should be noted that the negative terminal of supply 221 is grounded to the common ground of the system through line 220, contact C′ and contact C of contact assemblies 218 and 217, respectively.

It is now possible to describe in detail the operation of the present velocity indicator.

When the helicopter, on which the present air velocity indicator is mounted, is in motion and its Pitot tube 20 is caused to rotate by motor 22 (see Figures 2 and 4), a time varying signal is generated at the transducer 21, picked up by means of brushes 70 and 69 and applied to the input of cathode follower 24. The function of cathode follower 24 as previously mentioned is to transform the high impedance signal obtainable from the cathode resistance 77—78 of cathode follower 24.

The now low impedance signal goes through shielded lead 84, line 50, shielded lead 115 to the filter 25. The output of filter 25 is connected to the velocity amplifier 27 and the direction amplifier 28.

The signal at the output filter 25 is now essentially free of interfering signals supplied to the input of the first amplifier tube 125 of velocity amplifier 27. The signal is successively amplified by amplifier stages 151 and 167 and rectified at rectifier 181. The D. C. output voltage from rectifier 181 is impressed on air speed indicator 29 so that when indicator 29 is properly calibrated a reading in miles per hour is there obtained.

The reading obtained on air speed indicator 29 will give an accurate indicator of the speed with respect to air in which the helicopter is moving.

The signal from filter 25 is also applied to the input of tube 226 which is the first amplifier of the direction amplifier 28. Since the signal is of varying amplitude and direction amplifier 28 serves essentially to amplify the signals while maintaining their phase constant, the second amplifier tube 248 operates as the limiter 34 so that its output consists of a constant amplitude time varying signal. This constant amplitude time varying signal is applied to amplifiers 267, and 284 successively and the output from tube 284 is applied to the phase meter or direction indicator 30.

The phase meter 30 is also connected to the output of two-phase generator 31 driven also by motor 22 so that it makes a comparison between the phase of the signal derived from transducer 21 and two signals 90° out of phase with each other from generator 31 driven by motor 22 which as previously mentioned also drives the arm 41 on one end of which is mounted Pitot tube 20.

Phase meter 30 is responsive to the angular difference between the signals generated by generator 31 and those amplified by amplifier 28 so that it indicates the angle of the fore-and-aft axis of the helicopter with respect to its motion through the air.

Referring now to Figure 4 which shows another embodiment of the present invention, it will there be seen that arm 41 is here provided with two Pitot tubes 20 and 420 connected to a transducer similar to transducer 21 of Figure 3 so that at the output lead 50 there will be a combination of the signals produced by Pitot tubes 20 and 420.

Such an output will, of course, still vary sinusoidally at a frequency dependent on the speed of motor 22 contained in assembly 48. In this case as in the previous one, the output is conveyed by lead 50 to the velocity and direction amplifiers and thence to the speed indicator and the direction indicator, respectively.

In the foregoing the invention has been described solely in connection with specific illustrative embodiments thereof. Since many variations and modifications of the invention will now be obvious to those skilled in the art, it is preferred to be bound not by the specific disclosures herein contained but only by the appended claims.

I claim:

1. An air speed indicating system for a helicopter with at least one rotatable blade comprising a Pitot tube extending generally horizontally on the helicopter, structure mounting said Pitot tube for independent rotation on the helicopter in a region of the helicopter of relatively low air turbulence, motor means coupled to said structure for rotating said Pitot tube at a predetermined substantially constant speed independently of the blade rotation, a transducer responsive to pressure variations in said Pitot tube when rotated to produce corresponding alternating signals at the frequency of the rotation of said Pitot tube, and indicating means connected to said transducer to provide indications of the air speed of the helicopter from said alternating signals.

2. An air speed indicating system as claimed in claim 1, in which said Pitot tube is rotated by said motor means at a substantially constant rate with a linear velocity substantially greater than that of the air speeds to be indicated.

3. An air speed indicating system as claimed in claim 1, further including a second Pitot tube arranged on said structure substantially 180° from the first said Pitot tube and rotatable therewith with said transducer being responsive also to pressure variations in said second Pitot tube.

References Cited in the file of this patent

UNITED STATES PATENTS

| | | |
|---|---|---|
| 910,898 | Bonbright | Jan. 26, 1909 |
| 2,315,756 | Warner | Apr. 6, 1943 |
| 2,524,747 | Ayres et al. | Oct. 10, 1950 |
| 2,531,521 | Link | Nov. 28, 1950 |
| 2,618,962 | Plumley | Nov. 25, 1952 |